455-603 AU 233 EX CROSS REFERENCE EXAMINER

FIP3106 XR 3,503,061 233

March 24, 1970 T. E. BRAY ET AL 3,503,061

TELEMETERING SYSTEM WITH OPTOELECTRONIC COUPLING BETWEEN TRANSMISSION LINE AND METER

Filed July 20, 1966 2 Sheets-Sheet 1

INVENTORS:
THOMAS E. BRAY,
ROBERT E. SCHULTZ,
BARRY J. STERN,

BY Marvin Goldenberg
THEIR ATTORNEY.

INVENTORS:
THOMAS E. BRAY,
ROBERT E. SCHULTZ,
BARRY J. STERN,

BY [signature]
THEIR ATTORNEY.

United States Patent Office
3,503,061
Patented Mar. 24, 1970

3,503,061

TELEMETERING SYSTEM WITH OPTOELECTRONIC COUPLING BETWEEN TRANSMISSION LINE AND METER

Thomas E. Bray, Clay, N.Y., Robert E. Schultz, Bonaire, Netherlands Antilles, and Barry J. Stern, Hammond, Ind., assignors to General Electric Company, a corporation of New York Filed July 20, 1966, Ser. No. 566,678
Int. Cl. G08c *9/06, 19/22, 19/36*
U.S. Cl. 340—180 14 Claims

ABSTRACT OF THE DISCLOSURE

Telemetering system for reading utility meters and the like by means of existing telephone lines so as to obtain accurate meter readings and not interfere with normal telephone communication. An adaptive mechanism is supplied at each meter location for signal encoding and processing of the meter dial position, employing a first optoelectronic coupling between the meter and adaptive mechanism for encoding the meter count in electrical form, and a second optoelectronic coupling between the adaptive mechanism and telephone line for transmitting the encoded reading as a modulated optical signal.

The invention relates to telemetering systems for automatically reading meter instruments, and the like, from a remote station. More particularly, the invention relates to a novel telemetering system which employs established telephone lines as the transmission medium extending between each meter and a central station, and permits interrogation and reading of the meter without interfering either with normal telephone communication or with meter reading accuracy.

The development of a reliable and economical telemetering system for reading utility meters has been long a desired objective of those working in the field. A number of systems and techniques utilizing telephone lines (the use of which offers obvious advantage) have, in the past, been developed to varying degrees. These include the use of direct electrical connections between meter and line, capacitive interconnections and also inductive interconnections. None have proven to be entirely satisfactory. It has been found that a direct electrical connection cannot be readily made without interfering with normal telephone communication. In addition, the meter's electrical circuit may be interfered with and the accuracy of the obtained readings affected. Further, a serious objection exists with respect to the danger of high voltage coupling from the meter circuit to the telephone line through such direct connections, e.g., due to failure of an electrical component, such as a relay, or insulation breakdown, etc. It may be appreciated that this phenomenon must be totally avoided. The danger of high voltage coupling also exists with respect to the capacitive and inductive type of interconnection. It is also difficult to obtain the extreme accuracy and reliability that is required for meter readout using capacitive interconnections between meter and line, due to an insensitivity for readout of the meter dial that is characteristic of such capacitor structure. Further, inductive interconnections can create a loading down of the meter so as to introduce inaccuracies into the meter readings.

The present invention is intended to substantially overcome the above noted, as well as other disadvantages and limitations, e.g., economic, that have existed with respect to previously developed automatic meter reading systems.

It is accordingly an object of the invention to provide a novel telemetering system that is both accurate and economical for reading metering instruments, and the like, from a remote location, which system realizes a high degree of accuracy by introducing a minimum of interference into the electrical and mechanical operation of the instruments.

It is a further object of the invention to provide a novel telemetering system as above described which employs established telephone lines as the system's transmission media and avoids essentially all interference with normal telephone utilization.

It is another object of the invention to provide a novel telemetering system which permits the meter instruments to be accurately read from a remote location, while maintaining complete electrical isolation between said meter instruments and the system's transmission media.

It is still another object of the invention to provide a novel telemetering system as above described which utilizes an optoelectronic coupling between the meter instrument and the associated telephone lines for transforming the meter output data or count into an electrical signal form that can be readily transmitted by said telephone lines.

It is yet another object of the invention to provide a novel telemetering system as described wherein the meter modifications required are both of limited complexity and economical.

These and other objects of the invention are accomplished in a novel telemetering system wherein there is employed in combination with each meter instrument an optical encoding means for transforming the meter count into a coded electrical signal. More particularly, the optical encoding means includes a photosensitive impedance matrix, the individual impedance values of which are controlled as a function of the angular position of the meter dial shafts. There is further employed a relaxation oscillator circuit which includes a light transmitting element, such as a neon lamp, and the individual impedance elements are sequentially commutated into said oscillator circuit for shifting the frequency of oscillation in accordance with the encoded information contained by said impedance matrix. Across the telephone line extending between a remote interrogation or control station and the meter location is connected a light-responsive means, such as a photoconductor element, in optically coupled relationship with the light transmitting element, which serves to modulate the impedance of the telephone line in accordance with said encoded information. The modulating frequencies are within the pass band of the telephone line so that the modulated telephone line impedance can be detected at the control station. A further light transmitting element is connected across the telephone line in optically coupled relationship with a further light responsive element that is connected to the optical encoding means. An electrical interrogating signal transmitted from the control station is employed to energize said further light transmitting element and thereby initiate the meter reading operation and transmission.

The specification concludes with claims particularly pointing out and distinctly claiming the subject matter which is regarded as the invention. It is believed, however, that both as to its organization and method of operation, together with further objects and advantages thereof, the invention may be best understood from the following description taken in connection with the accompanying drawings in which:

Figure 1:
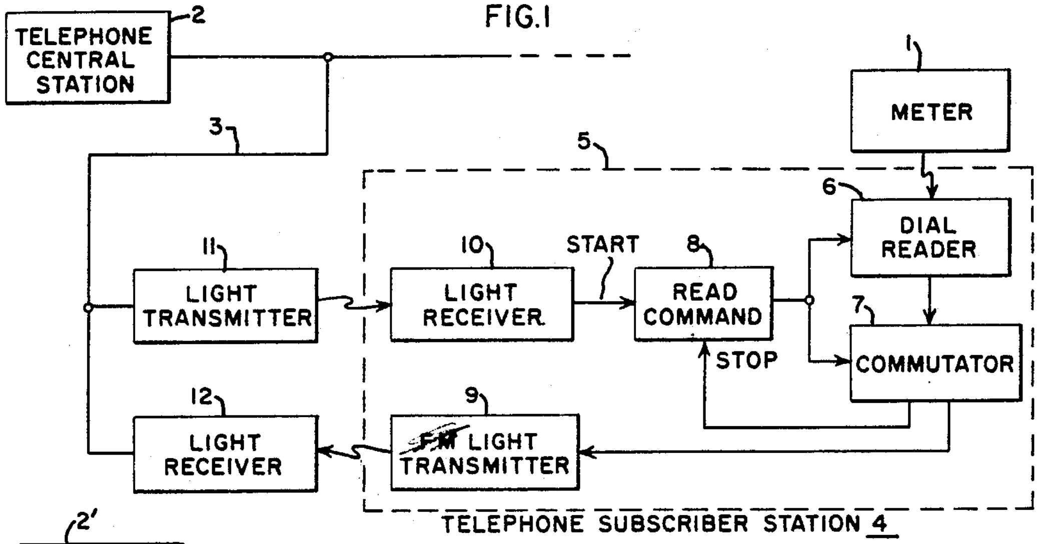
FIGURE 1 is a block diagram of a telemetering system in accordance with the invention.

Referring now to FIGURE 1, there is illustrated in block diagram form, a telemetering system employed to automatically read metering instruments, such as a utility meter 1, from a remotely located interrogating or control station 2. The system is adapted to utilize telephone lines, such as line 3, for communicating between the meter 1, located at a telephone subscriber station 4, and the control station 2. Although the control station is shown as a telephone central, it can be essentially any location that is connected to the telephone line. The telephone line 3 carries interrogating and meter reading signals between the control station 2 and the modified meter assembly, which includes the meter 1 plus adaptor components and circuitry that are enclosed within block 5. The adaptor components and circuitry of block 5 include a dial reader 6, a commutator 7, a read command network 8, a frequency modulated light transmitter 9 and a light receiver 10.

There is established a first optical interface between the meter assembly and the telephone line 3, which ensures electrical isolation of said telephone line. The light transmitter 9 and light receiver 10 are on the meter side of the interface. On the opposite side of the interface there are connected to the telephone line 3 a light transmitter 11 and a light receiver 12, which are optically coupled to the receiver 10 and transmitter 9, respectively. The light transmitter 11 may include, as examples, a neon lamp, an electroluminescent element, a light emitting diode, etc. Light receiver 10 is a photosensitive element that may include a photoconductor, photodiode, phototransistor, etc., the electrical properties of which are altered in response to applied light energy from transmitter 11.

Light transmitter 9 is a component generally similar in its light emissive characteristics to light transmitter 11. As will be seen, the device 9 is connected in an oscillator circuit, and it is therefore desirable that it have a negative resistance characteristic. Light transmitter 11 and light receiver 12, a device that may be generally similar to device 10, must have impedance properties that are compatible with the telephone line, as will be explained in detail presently.

The output of light receiver 10 is connected as a first input to read command network 8 for initiating the read operation. The output of network 8 is connected jointly to dial reader 6 and commutator 7. The meter 1 is optically coupled at a second optical interface to dial reader 6, which presents no electrical interference to the meter and a minimum of mechanical interference. The primary output of commutator 7 is connected to light transmitter 9, and a second output is connected to read command network 8 for terminating the read operation.

In response to an interrogating signal transmitted from the telephone central station 2 asking for a reading of the meter 1, light transmitter 11 becomes energized. This in turn actuates light receiver 10. The output from receiver 10 is coupled to read command network 8 which causes dial reader 6 and commutator 7 to be triggered into operation and thereby commence reading of the meter 1. Operation of the dial reader and commutator modulates the light transmitter 9 in a frequency shift keyed manner. The modulation is in accordance with the meter setting, thereby providing a coded light signal which is converted by light receiver 12 into an electrical signal that is communicated back to the telephone central station 2. At the termination of a complete reading, the commutating network 7 generates a signal that is applied to the read command network 8 for terminating the read operation.

Figure 2:
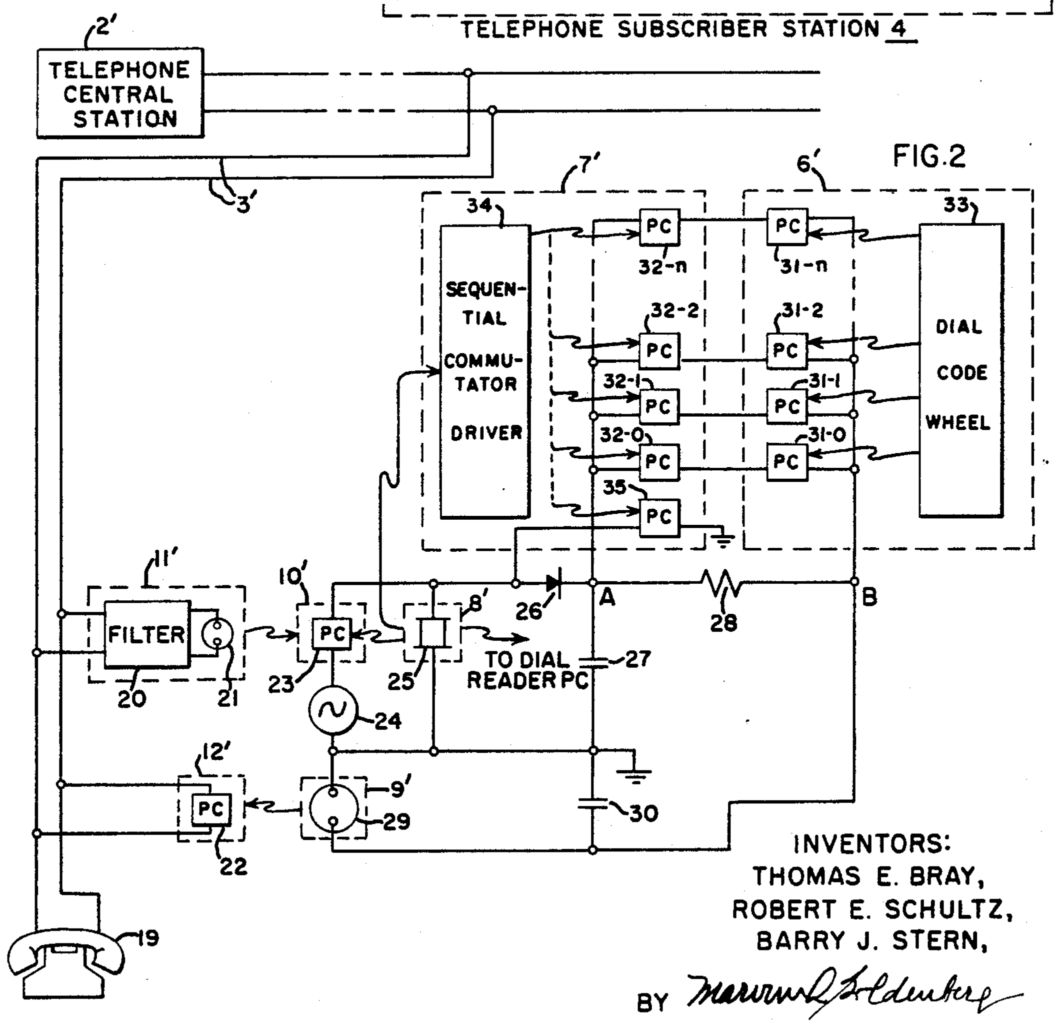
FIGURE 2 is a schematic circuit diagram of the invention which corresponds to the block diagram of FIGURE 1.

A schematic circuit diagram of the invention is shown in FIGURE 2, which in general conforms to the block diagram of FIGURE 1. Those components of FIGURE 2 which correspond to components in FIGURE 1 are provided with the same reference character designation, but with an added prime notation. Light transmitter 11′ includes a means for discriminating between the meter interrogating signal and the ordinary telephone ring signal, to which telephone 19 responds. In the embodiment being considered the discriminating means includes a filter network 20 connected across the telephone line 3′. Coupled to network 20 is a neon lamp 21. The filter network responds to a particular interrogating signal frequency that is sufficiently distinct from the resonant frequency of the telephone ring mechanism. In an alternative embodiment the network 20 may include means for distinguishing the interrogating signal on the basis of timing, amplitude or combinations thereof. The interrogating signal is at a level appropriate for energizing element 21 so that the element luminesces in response to application of the interrogating signal. It is essential that the light transmitting device 11′ when in the unenergized state present a sufficiently high impedance to the telephone line so as not to interfere with normal telephone communication and that it not respond to signals normally encountered on the line, such as test signals, etc. Thus, the unenergized impedance of device 11′ should be one to several orders of magnitude higher than the characteristic impedance of the telephone line. For example, for a line impedance of several hundred ohms, the unenergized impedance should be at least several thousand ohms. The energized impedance, however, is normally on the order of the telephone line impedance, which causes an "off hook" or answer signal to be returned to the telephone central. Similar impedance constraints apply for light receiver 12′, which includes a photoconductor 22 having a dark impedance state that is many orders of magnitude greater than the telephone line impedance and a light impedance that is on the order of the line impedance.

Light receiver 10′ includes a photoconductor 23 optically coupled to neon lamp 21. Photoconductor 23 is connected to one side of an alternating current source 24, the other side of which is connected to ground. In shunt with the photoconductor 23 and source 24 is connected an electroluminescent elements 25, which provides the read command function. Element 25 is optically coupled to photoconductor 23 for providing a memory function and "lock-on" of the element. Element 25 is also optically coupled to dial reader 6′ and commutator 7′ for initiating operation thereof, as will be further explained when considering the overall circuit operation. Connected from the junction of photoconductor 23 and electroluminescent element 25 to ground is the series arrangement of a semiconductor 26 and a capacitor 27 which provide rectification of the voltage from source 24. The junction of diode 26 and capacitor 27 is indicated as point A. Connected from point A to a further point B is a resistor 28.

A neon lamp 29 serves as the FM light transmitter 9′. The lamp 29 in shunt with a capacitor 30 is connected between point B and ground, and together with the supplied unidirectional voltage comprises a relaxation oscillator circuit in which the capacitor 30 is charged through resistor 28 and discharged through the lamp 29. The oscillation frequency of the circuit is essentially a function of the charge time constant.

Connected in parallel paths with resistor 28 are a matrix of dial reader photoconductors included in the dial reader component 6′, of which photoconductors 31–0, 31–1, 31–2 and 31–*n* are shown. As will be seen more clearly when considering FIGURE 4, the individual impedance values of these photoconductors are controlled as a function of the angular position of the meter dial shafts. Also connected in said parallel paths and in series, respectively, with the dial reader photoconductors 31–0 through 31–*n* are an array of commutator photoconductors, of which photoconductors 32–0, 32–1, 32–2 and 32–*n* are shown. Photoconductors 32–0 through 32–*n* are included in the commutator network 7′ and act to sequentially connect one of the dial reader photoconductors in parallel with resistor 28. There is thus effected a control of the relaxation oscillator frequency as a function of the impedance state of the dial reader photoconductors as they are effectively switched into the circuit, thereby generating a coded signal that is in accordance with the meter reading. The coded signal is transmitted in the form of frequency modulated light energy from lamp 29 which is coupled to photoconductor 22 for correspondingly modulating the line impedance.

In the example under consideration, there are provided ten dial reader photoconductor cells for each dial. If there are assumed to be five dials associated with the meter, there will be fifty dial reader photoconductors that are connected by the commutator 7' across points A and B. The dial reader photoconductors are illuminated in a selective manner by light energy emanating from electroluminescent element 25 which is directed through dial code wheels 33. As will be explained in greater detail when considering FIGURE 4, the dial code wheels are mounted on the dial shafts, one for each shaft, and provide illumination of the dial reader photoconductors as a function of the angular position of each shaft.

Figure 4:
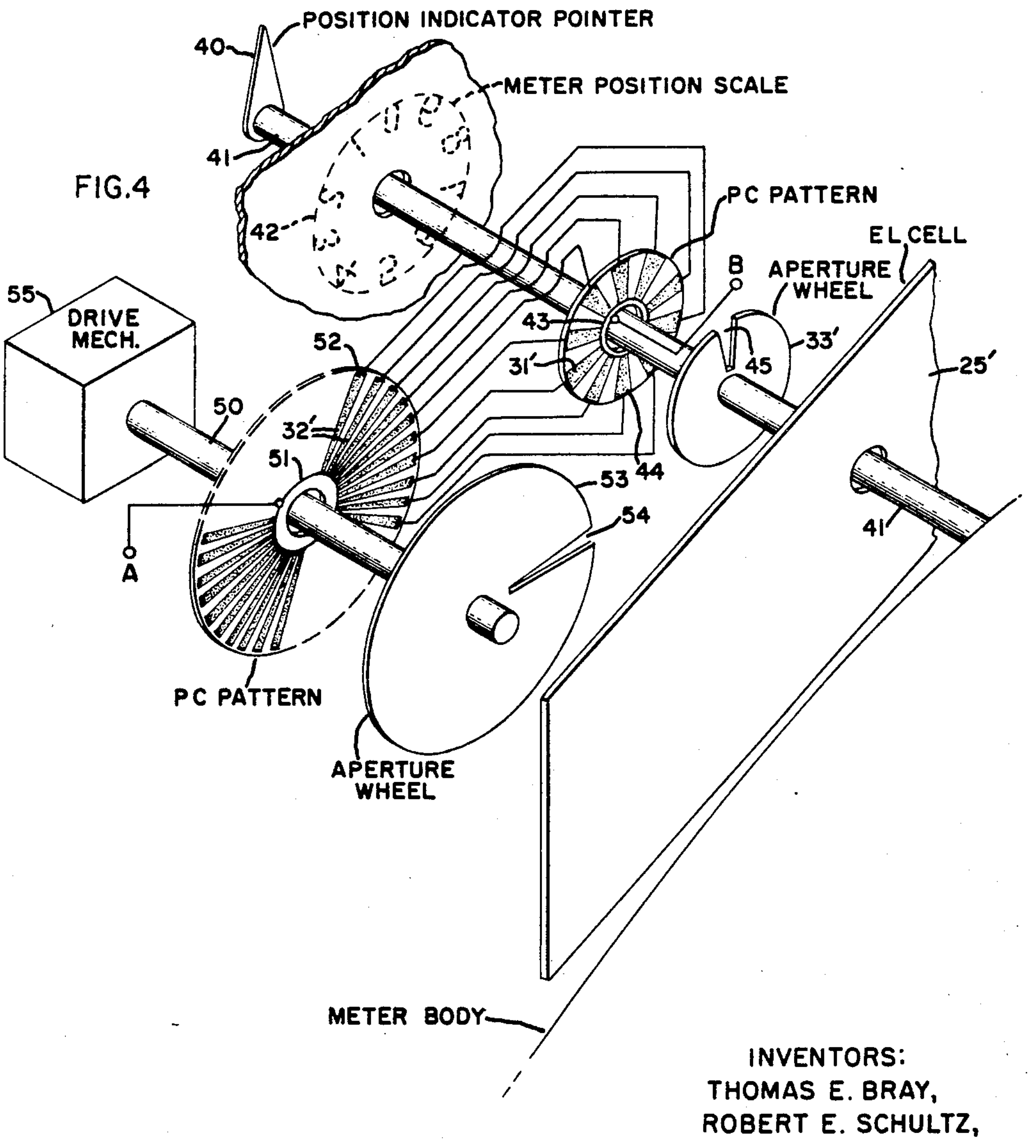
FIGURE 4 is an exploded perspective view of a single meter dial mechanism, including adaptor components that have been added to optoelectronically read out the dial count.

Light energy from electroluminescent element 25 is also coupled to a sequential commutator driver 34 which is included in the commutator assembly 7' for initiating the commutation process. The sequential commutator driver may take the form of an electrooptical shift register, such as disclosed in Patent No. 3,132,325, issued May 5, 1964 to T. E. Bray. Alternatively, the sequential commutator driver may be an electromechanical arrangement wherein an apertured wheel, similar to one of the dial code wheels, is employed to provide a sequential triggering of the commutator photoconductors. Such an electromechanical arrangement is shown in FIGURE 4. The commutator assembly 7' additionally includes a photoconductor 35 which is connected in shunt with electroluminescent element 25. After a single commutation cycle, photoconductor 35 is illuminated and thereby de-energizes electroluminescent element 25. This serves to terminate the read process until a subsequent interrogating pulse is received. In an alternative operation a termination signal could be transmitted from the interrogation station, after the meter reading has been received and verified, for energizing a further light transmitter that would be electrically connected to the telephone line and optically coupled to photoconductor 35.

Considering now the overall operation of the circuit of FIGURE 2, an automatic meter reading is initiated by the transmission of an interrogation signal from the telephone central station 2' through the telephone line 3' and filter 20, which signal excites element 21. The interrogation signal is typically a 110 volt, 35 cps. pulse. In response to the excitation of element 21, its impedance drops and an answer signal is returned to the telephone central station. Further, photoconductor 23 is triggered into its low impedance state so as to apply essentially the full A.C. potential of source 24 across electroluminescent element 25, causing this element to luminesce. The feedback optical coupling between electroluminescent element 25 and photoconductor 23 maintains the photoconductor in its low impedance state and the electroluminescent element in its energized state. In addition, the light energy generated by element 25 is coupled through the dial code wheels 33 to the dial reader photoconductor cells 31–0 through **31–*n*, and to the sequential commutator driver 34**.

The A.C. potential of source 24 is rectified by diode 26 and filtered by capacitor 27 to provide a D.C. potential to the relaxation oscillator circuit. The oscillator circuit oscillates at a frequency that is a function of the RC time constant of the charge path for capacitor 30. Since the value of capacitor 30 is fixed, the oscillation frequency may be considered to be entirely a function of the impedance between points A and B. Initially only resistor 28 is effectively connected in the oscillator circuit and hence the oscillator will oscillate at a fixed frequency $f_1$. As the various dial reader photoconductors 31–0 through **31–*n*** are switched into the circuit, the oscillator frequency will shift between $f_1$ and a second frequency $f_2$, in accordance with the photoconductor impedance values.

The dial reader photoconductors 31–0 through **31–*n* form an impedance matrix, with the impedance values of the various photoconductors supplying the meter reading in a coded format. Accordingly, during the period that a meter reading is being taken, certain of the dial reader photoconductors will be illuminated by electroluminescent element 25 and be in a low impedance state, and the remaining photoconductors will be in a high impedance state, as a function of the angular shaft positions of the meter dial mechanisms with which the photoconductors are associated. The commutator photoconductors 32–0 through 32–*n* act as switches and upon receiving illumination from the commutator driver 34** are sequentially closed for switching the dial reader photoconductors into the circuit.

In response to switching into the circuit dial reader photoconductors that are in a high impedance state, the impedance between points A and B is essentially unchanged from that of resistor 28 alone, and the oscillator circuit oscillates at frequency $f_1$. In response to switching into the circuit dial reader photoconductors that are in a low impedance state, the impedance between points A and B is greatly reduced. The frequency of oscillation for such condition is at $f_2$, which is a frequency discretely different and higher than $f_1$. In a typical operation $f_1$ may be at about 1200 c.p.s. and $f_2$ at about 2500 c.p.s. For the operation described, the serially connected commutator and dial reader photoconductors in each matrix path have a low impedance value at least an order of magnitude less than the impedance of resistor 28 and a high impedance value several orders of magnitude greater than that of resistor 28.

In accordance with the commutation of the dial reader photoconductor impedance matrix into the oscillator circuit, the neon lamp 29 generates light bursts at the frequency of oscillation of the circuit. Further, in accordance with the described operation, the frequency of the light bursts shifts between $f_1$ and $f_2$ as a function of the code that is established in the impedance matrix. Photoconductor 22 is responsive to the light energy generated by lamp 29 and accordingly modulates the impedance across the telephone line 3'. This modulated impedance is readily detected at the telephone central station 2' as a modulated current and from it the coded meter reading is obtained. It is noted that in addition to the impedance constraints previously recited with respect to photoconductor 22, during modulation of the photoconductor its A.C. impedance should be low enough to transmit signals of adequate signal strength.

Figure 3:
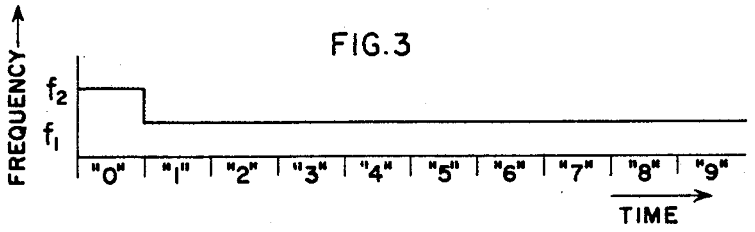
FIGURE 3 is a frequency versus time graph of the transmitted meter reading signal.

In FIGURE 3 there is illustrated a frequency versus time graph of the meter reading information transmitted during meter readout. It is noted that ten discrete positions are included in the graph, which corresponds to the reading of a single dial mechanism. In each position there is transmitted energy at the frequency indicated in a frequency shifted keyed manner. In practice, where there are five mechanisms, it may be appreciated that there will be fifty such positions for each complete meter reading. In the waveform illustrated, the first position is at frequency $f_2$ and the remaining positions at frequency $f_1$, which corresponds to a single dial reading of "0." Although the encoding scheme that may be used is arbitrary, in a simple scheme, it may be assumed that a frequency shift to $f_2$ in the second position is indicative of a dial reading of "1," in the third position a dial reading of "2," etc.

With reference to FIGURE 4, there is illustrated a single dial mechanism of the meter modified so as to accommodate an optical readout of the dial position. It may be appreciated that in practice each of the dial mechanisms is similarly modified. Those components in FIGURE 4 that correspond to components in FIGURE 2 are given a similar identifying legend, but with an added prime notation. The illustrated modified dial mechanism includes a conventional dial pointer 40 mounted on a dial shaft 41 and adjacent to dial face 42. To the rear of the dial face are the dial reader photoconductors arranged in a radial pattern of ten photoconductor strips 31'. The photoconductor strips have a common electrode 43 along the inside circumference of the radial pattern, which electrode is connected to point B in FIGURE 2. For each photoconductor there is a second electrode 44 in contact along the outside circumference of the radial pattern. To the rear of the photoconductor pattern, secured to the shaft 41, is an apertured code wheel 33' having a single aperture 45 slightly wider than the photoconductor strips 31'. Light energy from electroluminescent cell 25' is transmitted through aperture 45 for illuminating single photoconductor strips. Thus, as the shaft rotates different ones of the photoconductor strips 31' become illuminated. In practice, two adjacent photoconductors will be simultaneously illuminated for some readings. However, a desired meter reading accuracy can be readily obtained by providing a sufficient number of dial reader photoconductors.

The commutator assembly includes a pattern of radially arranged commutator photoconductors 32' mounted in strips around a shaft 50. The photoconductors 32' include a first common electrode 51 along the inside circumference of the radial pattern, and individual electrodes 52 along the outside circumference of the radial pattern. Common electrode 51 is connected to point A in the circuit of FIGURE 2. Each electrode of a group of ten electrodes 52 are connected, respectively, to single electrodes 44 of photoconductors 31'. The commutator assembly includes additional photoconductor strips, for convenience only a limited number being illustrated, which are intended to be connected to the dial reader photoconductors of the other meter dial mechanisms, not illustrated. To the rear of photoconductors 32', there is secured to the shaft 50 an apertured wheel 53 having an aperture 54 through which light energy is transmitted from electroluminescent cell 25'. A drive mechanism 55 is provided for rotating the shaft 50. The drive mechanism may be readily arranged to be controlled by electroluminescent cell 25'. For example, drive mechanism 55 may include a motor and a source of energizing potential connected to the motor through a series current limiting photoconductor that is optically coupled to electroluminescent cell 25'. In response to illumination of the photoconductor the motor causes shaft 50 to rotate at an appropriate angular velocity, e.g., on the order of one c.p.s. As the shaft rotates, commutator photoconductors 32' are sequentially illuminated, thus effectively switching the dial reader photoconductors 31' into the circuit of FIGURE 2 between points A and B.

Although the invention has been described in considerable detail with respect to a specific embodiment thereof for purposes of clear and complete disclosure, it is recognized that numerous modifications and variations can be made by workers skilled in the art which will not exceed the basic teaching set forth.

What we claim as new and desire to secure by Letters Patent of the United States is:

1. In combination with a meter instrument, apparatus which enables said instrument to be automatically read from a remote station comprising:

(a) optical encoding means for transforming the meter count into an electrical signal,
(b) light transmitting means, and
(c) means for modulating the light output of said light transmitting means as a function of said electrical signal.

2. Apparatus as in claim 1 wherein said meter instrument has at least a single dial shaft and said optical encoding means includes a photosensitive impedance matrix, the impedance values of which provide an encoding of the dial shaft angular position.

3. Apparatus as in claim 2 wherein said light transmitting means and said impedance matrix are connected in a relaxation oscillator circuit so that the frequency of oscillations of said circuit and the frequency of the transmitted light energy are a function of the impedance values of the matrix.

4. Apparatus as in claim 3 which further includes commutating means for sequentially connecting the individual impedance matrix elements into said oscillator circuit, thereby producing a frequency shift keyed modulation of said circuit which generates output light energy in the form of a digital pulse code corresponding to the meter reading count.

5. Apparatus as in claim 4 which further includes light receiving means that in response to applied light energy initiates operation of the optical encoding and light transmitting means.

6. A telemetering system for automatically reading the count of a meter instrument at a given location from a remote station, comprising:

(a) optical encoding means for transforming the meter count into an electrical signal,
(b) first light transmitting means,
(c) means for modulating the light output of said light transmitting means as a function of said electrical signal,
(d) a transmission medium extending between said remote station and the location of said meter, and
(e) first light responsive means electrically connected to said transmission medium at said meter location and optically coupled to said light transmitting means for varying the impedance properties of said transmission medium in response to the modulated light energy, whereby the meter reading count is transmitted in encoded electrical form from said meter to said remote station.

7. A telemetering system as in claim 6 which includes a second light transmitting means electrically connected to said transmission medium at said meter location and a second light responsive means electrically connected to said encoding means and in optically coupled relationship with said second light transmitting means for initiating operation of said encoding means in response to an interrogating signal sent from said remote station which energizes said second light transmitting means.

8. A telemetering system as in claim 7 wherein said transmission medium is a telephone line.

9. A telemetering system as in claim 8 wherein said meter instrument has at least a single dial shaft and said optical encoding means includes a photosensitive impedance matrix, the impedance values of which provide an encoding of the meter dial shaft angular position.

10. A telemetering system as in claim 9 wherein said first light transmitting means and said impedance matrix are connected in a relaxation oscillator circuit so that the frequency of oscillations of said circuit and the frequency of the transmitted light energy from said first light transmitting means are a function of the impedance values of the matrix.

11. A telemetering system as in claim 10 which further includes a photoconductive commutating means for sequentially connecting the individual impedance matrix elements into said oscillator circuit, thereby producing a frequency shift keyed modulation of said circuit which generates output light energy from said first light transmitting means in the form of a digital pulse code corresponding to the meter reading count.

12. A telemetering system as in claim 11 wherein said first light responsive means is a photoconductor connected across said telephone line having an energized impedance state that is on the order of the characteristic impedance of the telephone line and an unenergized impedance state that is at least an order of magnitude greater than said characteristic impedance, which photoconductor, in response to applied modulated light energy, correspondingly modulates the telephone line impedance.

13. A telemetering system as in claim 12 wherein said second light transmitting means includes a light emitting device connected across said telephone line exhibiting an unenergized impedance state that is at least an order of magnitude greater than said characteristic impedance, said second light transmitting means being selectively responsive to said interrogating signal.

14. A telemetering system as in claim 13 wherein the telephone line impedance is modulated at frequencies that are within the pass band of the line.

References Cited

UNITED STATES PATENTS

| | | | |
|---|---|---|---|
| 3,083,357 | 3/1963 | Chapin | 340—180 |
| 3,311,824 | 3/1967 | Pitt | 340—190 |
| 3,381,288 | 4/1968 | Vlodrop | 340—264 |

THOMAS B. HABECKER, Primary Examiner

U.S. Cl. X.R.

250—199; 340—151, 190, 206

179-2.4